S. L. FILSON.
SPRING TIRE.
APPLICATION FILED JUNE 9, 1916.
1,212,036.
Patented Jan. 9, 1917.
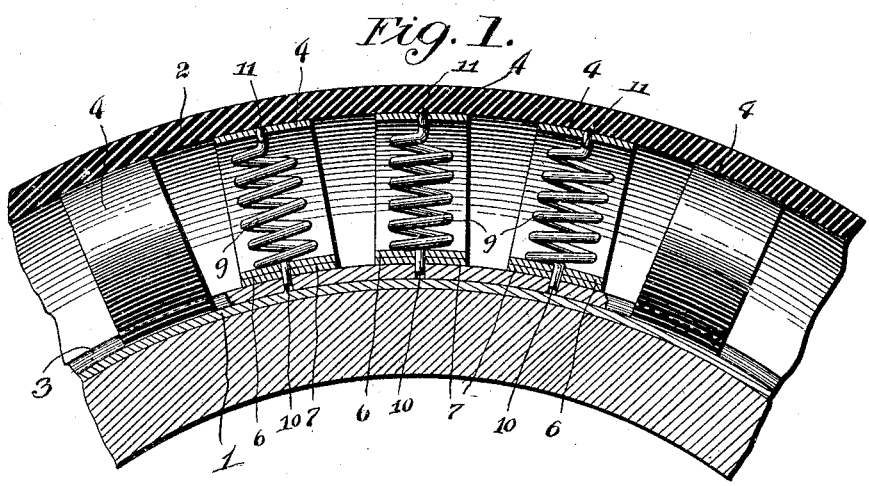
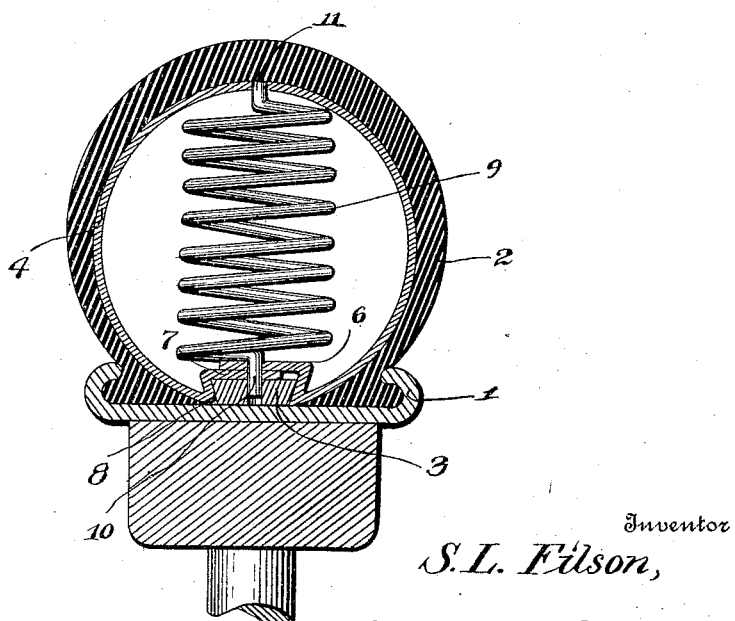
Witnesses
Inventor
S. L. Filson,
By Victor J. Evans
Attorney

UNITED STATES PATENT OFFICE.

SAMUEL L. FILSON, OF KANSAS CITY, MISSOURI.

SPRING-TIRE.

1,212,036.　　　　Specification of Letters Patent.　　Patented Jan. 9, 1917.

Application filed June 9, 1916. Serial No. 102,745.

*To all whom it may concern:*

Be it known that I, SAMUEL L. FILSON, a citizen of the United States, residing at Kansas City, in the county of Jackson and State of Missouri, have invented new and useful Improvements in Spring-Tires, of which the following is a specification.

This invention is an improved spring tire, especially adapted to be used in place of an inner tube in an automobile tire, the object of the invention being to provide an improved automobile tire which obviates the objections to the use of pneumatic tires and which possesses all the advantages in the way of resilience that are obtained by the use of pneumatic rubber tires and are much less liable to injury, are more durable, and are less expensive than tires of the pneumatic type.

The invention consists in the features of construction, combination, and arrangement of devices, hereinafter fully described and claimed.

In the accompanying drawings:—Figure 1 is a sectional view of a portion of an automobile wheel provided with a tire embodying my improvements. Fig. 2 is a transverse sectional view of the same.

For the purposes of this specification, a portion of the rim of an automobile wheel is indicated at 1 and the usual outer tire tube or casing is indicated at 2. In accordance with my invention I provide a band 3 which is made of steel and the outer side of which is wider than the inner side so that the band is cross sectionally dove-tailed in shape as shown.

I also provide a series of tubular segments 4 which are made of spring steel and are of suitable thickness. Each tubular segment is open at the inner side and comprises overlapping ends 6, 7, which are inset as shown to form a groove 8 for the reception of the band 3.

In each tubular segment is a coiled spring 9 which is arranged radially with respect to the wheel and has a straight inner end 10 which is inserted in registering openings in the band 3 and the overlapping ends of the tubular segment, so that the said spring serves to lock the ends of the segment together and also serves to secure the segment to the band 3. Each spring also has a straight outer end 11 which is inserted in an opening in the outer side of the tubular segment. The inner tube thus formed, by the band and the tubular segments, is placed in the outer tube of the tire and takes the place of a pneumatic inner tube, affording the desired resilience and causing the tire to present the same appearance as a pneumatic tire. The springs cause the tubular segments to hold the casing or outer tire in proper shape at all times, as will be understood.

Having described the invention, what is claimed is:

1. In a spring tire, a band, tubular segments, each having a groove on the inner side to receive the band and a spring in each tubular segment, having its outer end attached to the outer side of the segment and its inner end inserted in registering openings in the segment and band and thereby detachably securing the band and segment together.

2. In a spring tire, a band, tubular segments, each having a groove on the inner side to receive the band and a spring in each tubular segment, having its outer end attached to the outer side of the segment and its inner end inserted in registering openings in the segment and band and thereby detachably securing the band and segment together, the said segment being open on the inner side, and having overlapping ends provided with openings through which the inner end of the spring extends.

In testimony whereof I affix my signature.

SAMUEL L. FILSON.

Copies of this patent may be obtained for five cents each, by addressing the "Commissioner of Patents, Washington, D. C."